(12) United States Patent
Nishikawa

(10) Patent No.: US 10,740,056 B2
(45) Date of Patent: Aug. 11, 2020

(54) PRINTING APPARATUS, CONTROL METHOD OF PRINTING APPARATUS AND STORAGE MEDIUM

(71) Applicant: CANON KABUSHIKI KAISHA, Tokyo (JP)

(72) Inventor: Yukinori Nishikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/360,391

(22) Filed: Mar. 21, 2019

(65) Prior Publication Data

US 2019/0303081 A1 Oct. 3, 2019

(30) Foreign Application Priority Data

Mar. 30, 2018 (JP) ................................ 2018-067506

(51) Int. Cl.
*G06F 3/12* (2006.01)
*B41J 2/015* (2006.01)

(52) U.S. Cl.
CPC ............ *G06F 3/1295* (2013.01); *B41J 2/015* (2013.01); *G06F 3/1208* (2013.01); *G06F 3/1215* (2013.01); *G06F 3/1242* (2013.01)

(58) Field of Classification Search
CPC .... G06F 3/1295; G06F 3/1215; G06F 3/1242; G06F 3/1208; B41J 2/015
See application file for complete search history.

(56) References Cited

U.S. PATENT DOCUMENTS

| 6,547,355 | B1* | 4/2003 | Shimada | ................. | B41J 2/2132 |
| | | | | | 347/12 |
| 2008/0204776 | A1* | 8/2008 | Wakasa | ................. | G06K 15/028 |
| | | | | | 358/1.9 |
| 2016/0103642 | A1* | 4/2016 | Oi | .......................... | G06F 3/1243 |
| | | | | | 358/540 |
| 2016/0221373 | A1* | 8/2016 | Nishikawa | ................. | B41J 2/51 |

FOREIGN PATENT DOCUMENTS

JP 2017-132175 A 8/2017

OTHER PUBLICATIONS

Tada, JP 2017-132175, Recording Device and Transfer Method for Image Data, Aug. 3, 2017, Cited portions of English Translation.*

* cited by examiner

*Primary Examiner* — Neil R Mclean
(74) *Attorney, Agent, or Firm* — Venable LLP

(57) ABSTRACT

A printing apparatus conveys a printing medium in a first direction, and includes an encoder that outputs a predetermined signal in accordance with a conveyance amount of the printing medium in the first direction, and a print head having a plurality of nozzle rows, each of which includes a plurality of nozzles ejecting ink, arrayed in a second direction intersecting with the first direction. In addition, a print engine is connected with the print head and performs conversion processing from image data into print data. The print engine has a first buffer storing the image data, has a second buffer storing the print data, and converts image data stored in the first buffer into print data in response to a first interrupt signal based on the predetermined signal output from the encoder, and stores the print data in the second buffer.

17 Claims, 15 Drawing Sheets

PRINTING APPARATUS, CONTROL METHOD OF PRINTING APPARATUS AND STORAGE MEDIUM

BACKGROUND OF THE INVENTION

Field of the Invention

The present invention relates to a printing apparatus that prints an image on a printing sheet, a control method of a printing apparatus, and a storage medium.

Description of the Related Art

Conventionally, the ink jet printing apparatus is prevailing in the wide industrial field as a printing unit that is comparatively simple and excellent and for the ink jet printing apparatus, an increase in the printing speed, an improvement in image quality, and so on are requested.

Then, as one measure to respond to the request for an increase in the printing speed, an ink jet printing apparatus including a line head in which nozzle rows are arranged perpendicular to the conveyance direction of a printing sheet and having the same length as the width of the printing sheet is adopted.

Further, in the ink jet printing apparatus including the line head such as this, aiming at transmission of print data at a high speed and accurately, a method of controlling a buffer that stores print data has been proposed (Japanese Patent Laid-Open No. 2017-132175). In this method, a head controller allocated to each of a plurality of print heads is caused to include a buffer corresponding to each nozzle row and having a read pointer and by the head controller, the position of the pointer is managed and a transfer request to a high-order controller is controlled.

However, the method in which the head controller manages the position of the read pointer in the buffer provided for each nozzle row of the print head has such a problem that control becomes complicated because as the number of nozzle rows increases, the number of management-target pointers increases.

SUMMARY OF THE INVENTION

The present invention has been made in view of the conventional problem described above and an object is to provide an image forming apparatus capable of simple buffer control in a printing apparatus including a plurality of nozzle rows.

In order to attain the above-described object, the present invention is a printing apparatus including: a conveyance unit configured to convey a printing medium; an encoder that outputs a predetermined signal in accordance with a drive amount of the conveyance unit; a print head in which a plurality of nozzle rows in which a plurality of nozzles ejecting ink is arrayed is arrayed in a direction intersecting with a conveyance direction of the printing medium; and a print engine connected with the print head and performing conversion processing from image data into print data, and the print engine: has a first buffer storing the image data; has a second buffer storing the print data; and converts image data stored in the first buffer into print data in response to a first interrupt signal based on the predetermined signal output from the encoder, and stores the print data in the second buffer.

Further features of the present invention will become apparent from the following description of exemplary embodiments with reference to the attached drawings.

DESCRIPTION OF THE EMBODIMENTS

In the following, with reference to the drawings, a printing apparatus according to embodiments of the present invention is explained. The following embodiments are not intended to limit the present invention and all combinations of features explained in the present embodiments are not necessarily indispensable to the solution of the present invention.

Figure 1:
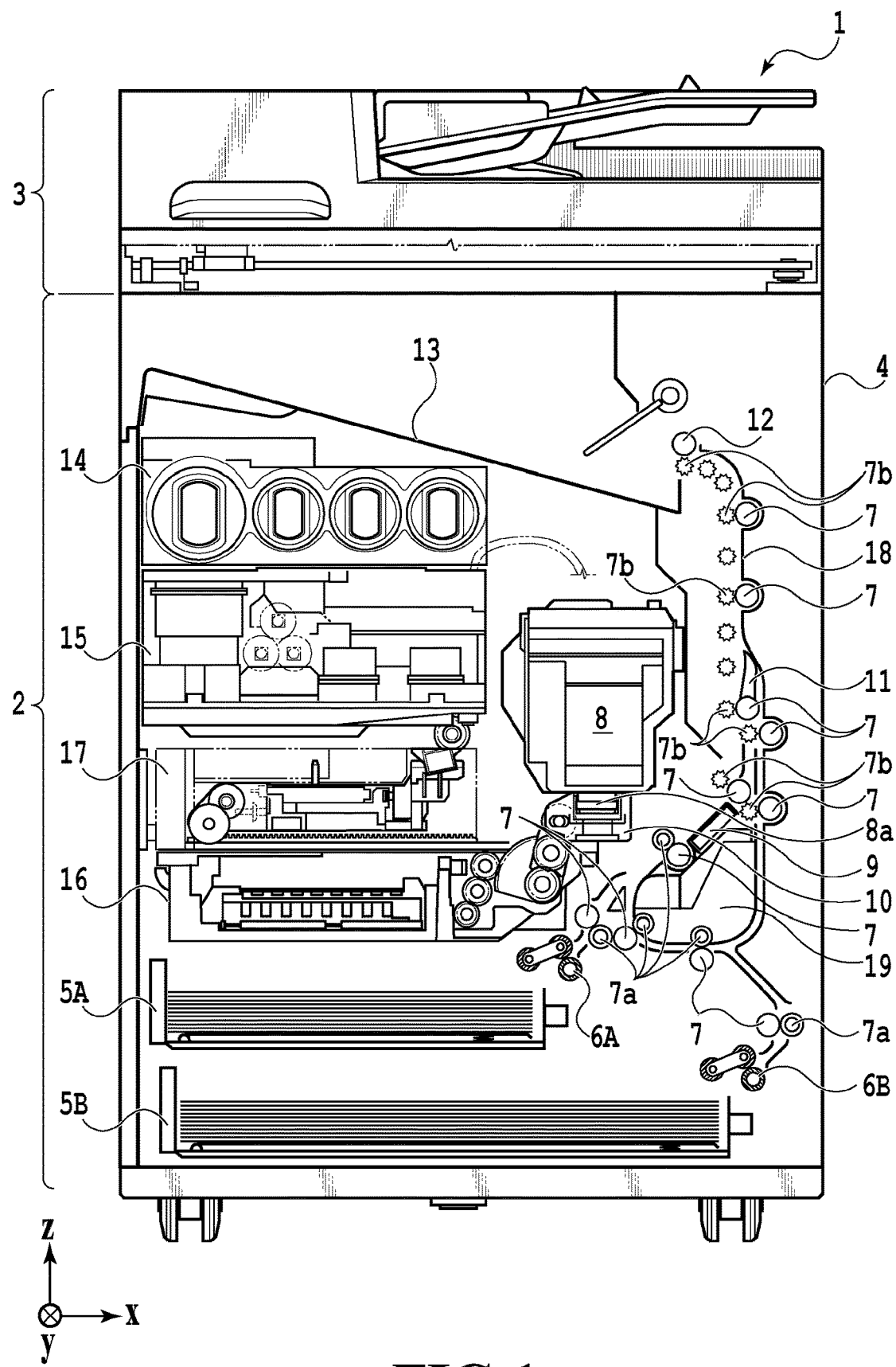
FIG. 1 is an internal configuration diagram of an ink jet printing apparatus.

FIG. 1 is an internal configuration diagram of an ink jet printing apparatus 1 (hereinafter, printing apparatus 1). In FIG. 1, the x-direction indicates the horizontal direction, the y-direction (direction perpendicular to the paper surface) indicates the direction in which ejection ports are arrayed in a print head 8, to be described later, and the z-direction indicates the vertical direction, respectively.

The printing apparatus 1 is a multi function printer including a print unit 2 and a scanner unit 3 and capable of performing a variety of kinds of processing relating to the printing operation and the reading operation by the print unit 2 and the scanner unit 3 individually, or in an interlocking manner of the print unit 2 and the scanner unit 3. The scanner unit 3 includes an ADF (Auto Document Feeder) and an FBS (Flat Bed Scanner) and is capable of reading a document automatically fed by the ADF and reading (scanning) a document placed on a document table of the FBS by a user. Here, the multi function printer is one having both the print unit 2 and the scanner unit 3, but the multi function printer may be an aspect in which the scanner unit 3 is not included. FIG. 1 shows a case where the printing apparatus 1 is in a standby state where the printing apparatus 1 is performing neither the printing operation nor the reading operation.

In the print unit 2, at the bottom in the vertically downward direction of a casing 4, a first cassette 5A and a second cassette 5B for storing a printing medium (cut sheet) S are installed in an attachable and detachable manner. In the first cassette 5A, comparatively small printing media up to the A4 size, and in the second cassette 5B, comparatively large printing media up to the A3 size are stored in a piled-up manner. In the vicinity of the first cassette 5A, a first feed unit 6A for feeding stored printing media by separating one by one is provided. Similarly, in the vicinity of the second cassette 5B, a second feed unit 6B is provided. In a case where the printing operation is performed, the printing medium S is selectively fed from one of the cassettes.

A conveyance roller 7, a discharge roller 12, a pinch roller 7a, a spur 7b, a guide 18, an inner guide 19, and a flapper 11 are conveyance mechanisms for guiding the printing medium S in a predetermined direction. The conveyance roller 7 is arranged on the upstream side and on the downstream side of the print head 8 and is a drive roller that is driven by a conveyance motor, not shown schematically. The pinch roller 7a is a follower roller that nips and rotates the printing medium S together with the conveyance roller 7. The discharge roller 12 is arranged on the downstream side of the conveyance roller 7 and is a drive roller that is driven by a conveyance motor, not shown schematically. The spur 7b sandwiches and conveys the printing medium S together with the conveyance roller 7 arranged on the downstream side of the print head 8 and the discharge roller 12.

The guide 18 is provided in the conveyance path of the printing medium S and guides the printing medium S in a predetermined direction. The inner guide 19 is a member extending in the y-direction and has a curved side surface, and guides the printing medium S along the side surface. The flapper 11 is a member for switching directions in which the printing medium S is conveyed at the time of the both-side printing operation. A discharge tray 13 is a tray for loading and holding the printing medium S for which the printing operation has been completed and which is discharged by the discharge roller 12.

The print head 8 is a color ink jet print head of line head type and in which a plurality of ejection ports from which ink is ejected in accordance with print data is arrayed along the y-direction (that is, the direction intersecting with the conveyance direction of the printing medium S) so as to correspond to the width of the printing medium S. A platen 9 is configured by a flat plate extending in the y-direction and supports the printing medium S from the rear side, for which the printing operation is performed by the print head 8.

An ink tank unit 14 stores four color inks to be supplied to the print head 8, respectively. Here, the four color inks refer to inks of cyan (C), magenta (M), yellow (Y), and black (K). An ink supply unit 15 is provided on the way in the flow path connecting the ink tank unit 14 and the print head 8 and adjusts the pressure and the amount of flow of the ink within the print head 8 to an appropriate range. The printing apparatus 1 has a circulation-type ink supply system and the ink supply unit 15 adjusts the pressure of the ink supplied to the print head 8 and the amount of flow of the ink recovered from the print head 8 to an appropriate range. A maintenance unit 16 includes a cap unit 10 and a wiping unit 17 and performs the maintenance operation for the print head 8 by causing these units to operate at predetermined timing.

Figure 2:
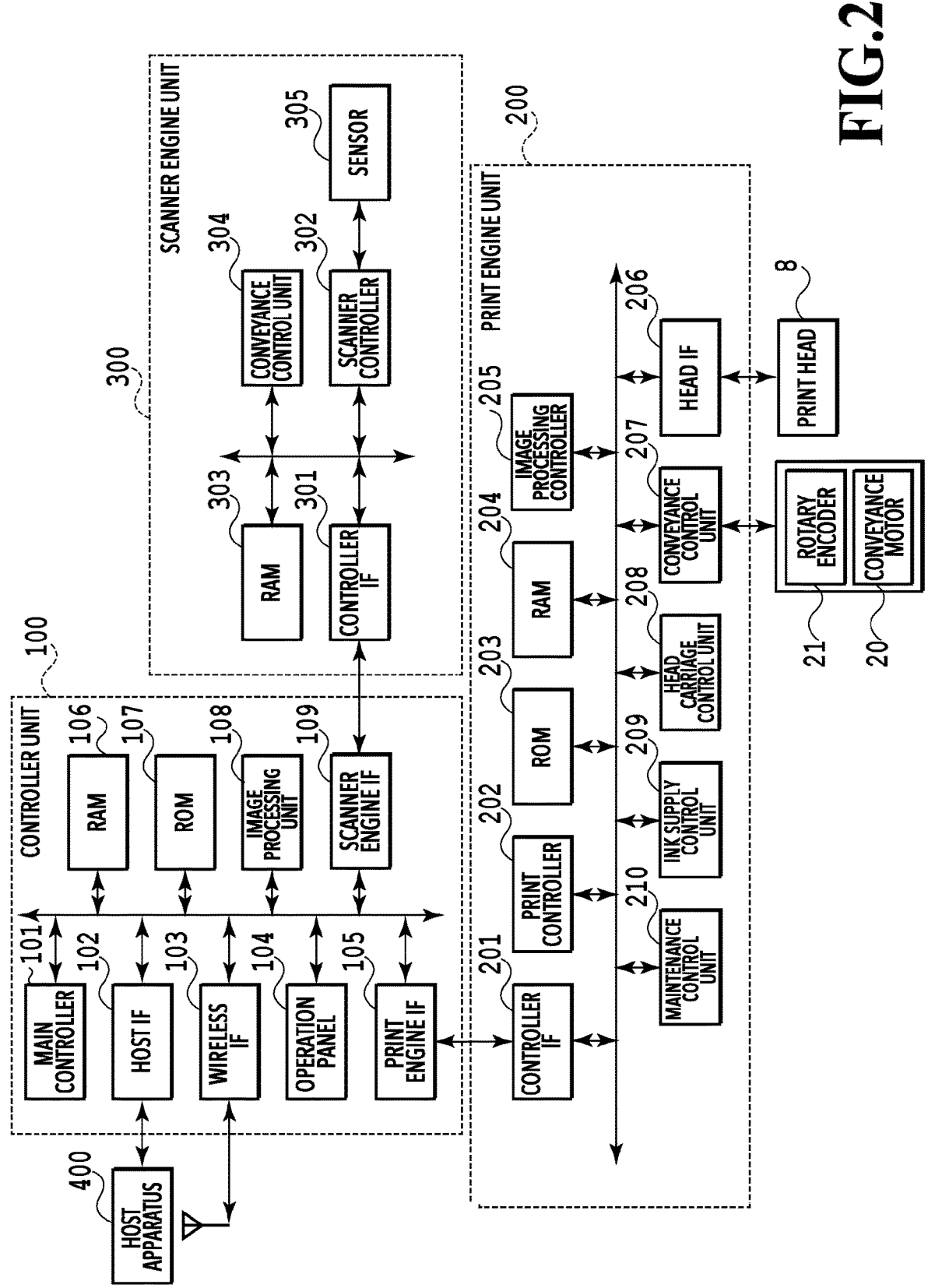
FIG. 2 is a block diagram showing a control configuration of the printing apparatus.

FIG. 2 is a block diagram showing a control configuration in the printing apparatus 1. The printing apparatus 1 mainly includes a print engine unit 200 configured to centralizedly control the print unit 2, a scanner engine unit 300 configured to centralizedly control the scanner unit 3, and a controller unit 100 configured to centralizedly control the entire printing apparatus 1. A print controller 202 controls various mechanisms of the print engine unit 200 in accordance with instructions of a main controller 101 of the controller unit 100. Various mechanisms of the scanner engine unit 300 are controlled by the main controller 101 of the controller unit 100. In the following, details of the control configuration are explained.

In the controller unit 100, the main controller 101 including a CPU controls the entire printing apparatus 1 by using a RAM 106 as a work area in accordance with programs and various parameters stored in a ROM 107. For example, in a case where a print job is input from a host apparatus 400 via a host I/F (interface) 102 or a wireless I/F 103, an image processing unit 108 performs predetermined image processing for the received image data in accordance with instructions of the main controller 101. The predetermined image processing performed in the image processing unit 108 includes binarization processing to convert multivalued image data into binary image data. Then, the main controller 101 transmits the image data for which the image processing has been performed to the print engine unit 200 via a print engine I/F 105. Further, the main controller 101 transmits each command for giving instructions to the print controller 202 to the print engine unit 200 separate from the image data via the print engine I/F 105.

The printing apparatus 1 may acquire image data from the host apparatus 400 via wireless communication or wired communication or may acquire image data from an external storage device (USB memory and the like) connected to the printing apparatus 1. However, the communication method that is made use of for wireless communication or wired communication is not limited to this. For example, as the communication method that is made use of for wireless communication, it is possible to apply Wi-Fi (Wireless Fidelity) (registered trademark) and Bluetooth (registered trademark). Further, as the communication method that is made use of for wired communication, it is possible to apply USB (Universal Serial Bus) and the like. In addition, for example, in a case where a read command is input from the host apparatus 400, the main controller 101 transmits this command to the scanner unit 3 via a scanner engine I/F 109.

An operation panel 104 is a mechanism for a user to input and output for the printing apparatus 1. It is possible for a user to give instructions as to the operation, such as copying and scanning, to set a printing mode, to recognize information on the printing apparatus 1, and so on via the operation panel 104.

In the print engine unit 200, the print controller 202 including a CPU controls various mechanisms included in the print unit 2 by using a RAM 204 as a work area in accordance with programs and various parameters stored in a ROM 203.

A controller I/F 201 performs transmission and reception of various commands and communication of image data with the print engine I/F 105. In a case of receiving various commands and image data via the controller I/F 201, the print controller 202 temporarily stores them in the RAM 204. An image processing controller 205 converts the image data saved in the RAM 204 into print data in accordance with instructions of the print controller 202 so that the print head 8 can make use of for the printing operation. In a case of performing the processing to convert image data into print data (conversion processing), the image processing controller 205 further outputs an interrupt signal (image processing completion interrupt signal) indicating that the conversion processing is completed to the print controller 202. The conversion processing from image data into print data performed in the image processing controller 205 includes smoothing processing.

In the following, explanation is given by taking the buffer within the RAM 204, which stores image data received from the print controller 202, as a first buffer and the buffer within the RAM 204, which stores print data converted by the image processing controller 205, as a second buffer.

Then, at the time of performing the printing operation after this, the print controller 202 conveys the printing medium S by driving the feed units 6A and 6B, the conveyance roller 7, the discharge roller 12, and the flapper 11 shown in FIG. 1 via a conveyance control unit 207.

Figure 3:
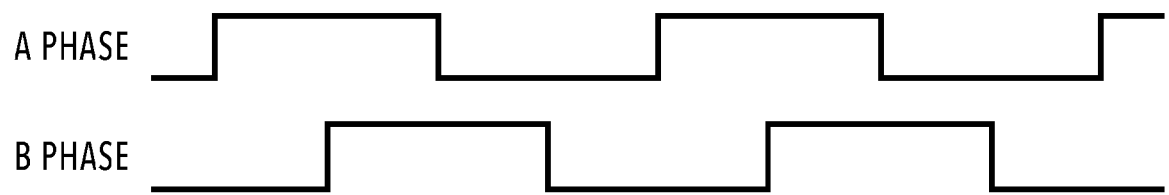
FIG. 3 is a diagram showing a signal output by a rotary encoder.

To the axis of a conveyance motor 20 that drives the conveyance roller 7, a rotary encoder 21 is attached. The rotary encoder 21 is, for example, an optical rotary encoder and provided to detect the conveyance amount of the printing medium S in accordance with the drive amount of the conveyance motor 20. In a case where the conveyance motor 20 rotates a predetermined amount, the rotary encoder 21 outputs a predetermined signal. Specifically, as shown in FIG. 3, the rotary encoder 21 outputs an A-phase signal and a B-phase signal in accordance with the drive amount (eventually corresponding to the conveyance amount of the printing medium S) of the conveyance motor 20. As a supplement, the B-phase signal is in a phase relationship in which the phase of the B-phase signal is delayed from that of the A-phase signal by 90 degrees and used for determining (checking) the rotation direction of the rotary encoder 21.

Figure 4:
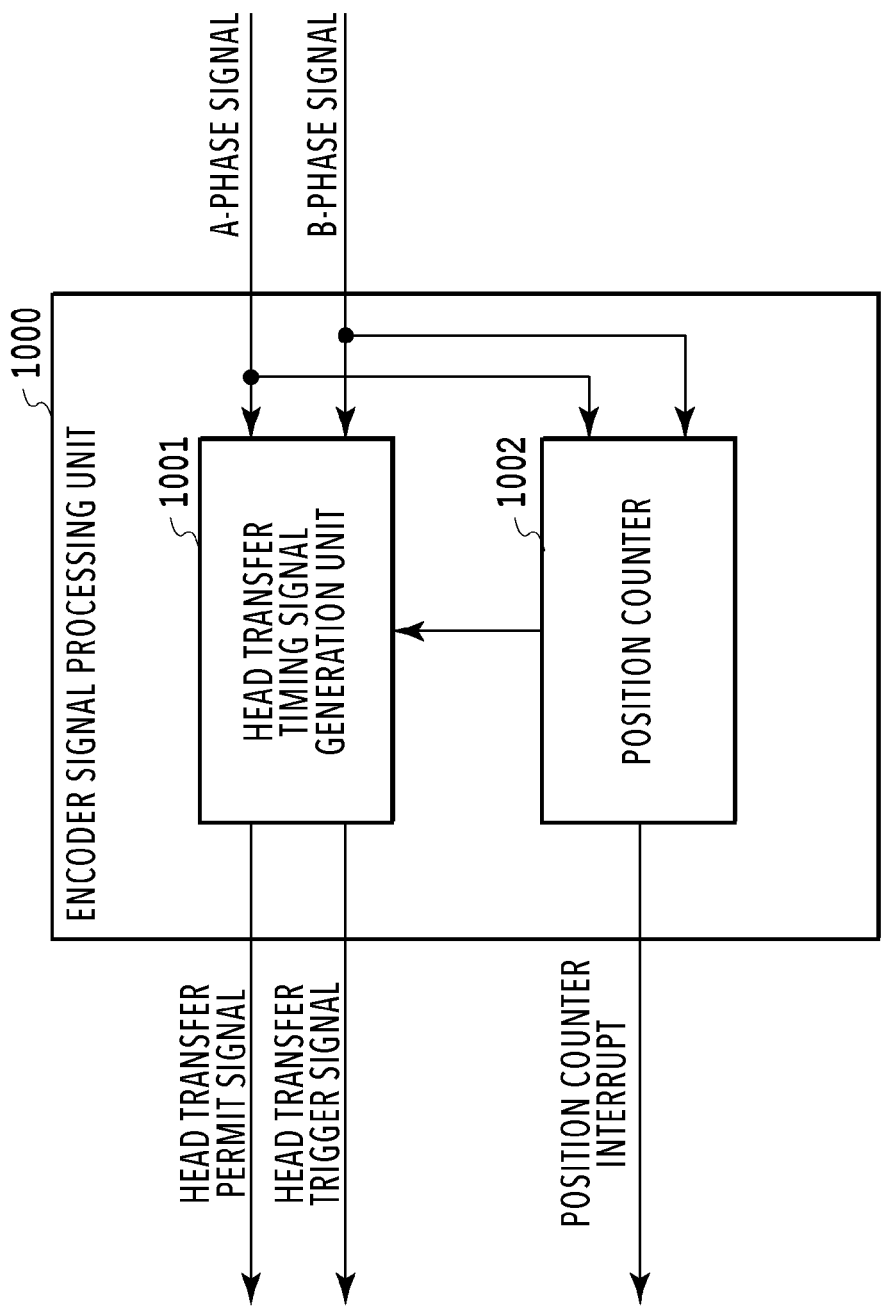
FIG. 4 is a block diagram showing a configuration of an encoder signal processing unit.

The A-phase signal and the B-phase signal output from the rotary encoder are input to an encoder signal processing unit 1000 of the conveyance control unit 207. In more detail, the encoder signal processing unit 1000 includes a head transfer timing signal generation unit 1001 and a position counter 1002 and the A-phase signal and the B-phase signal are input to the head transfer timing signal generation unit 1001 and the position counter 1002, respectively, as shown in FIG. 4.

The position counter 1002 monitors the A-phase signal and increments a position counter value for each rise edge of the A-phase signal. The position counter 1002 includes a register to which it is possible for the print controller 202 to set a predetermined value and in a case where the incremented position counter value becomes equal to a predetermined value set to the register, the position counter 1002 outputs a position counter interrupt signal to the print controller 202. In addition, the position counter 1002 outputs the position counter value to the head transfer timing signal generation unit 1001.

Figure 5:
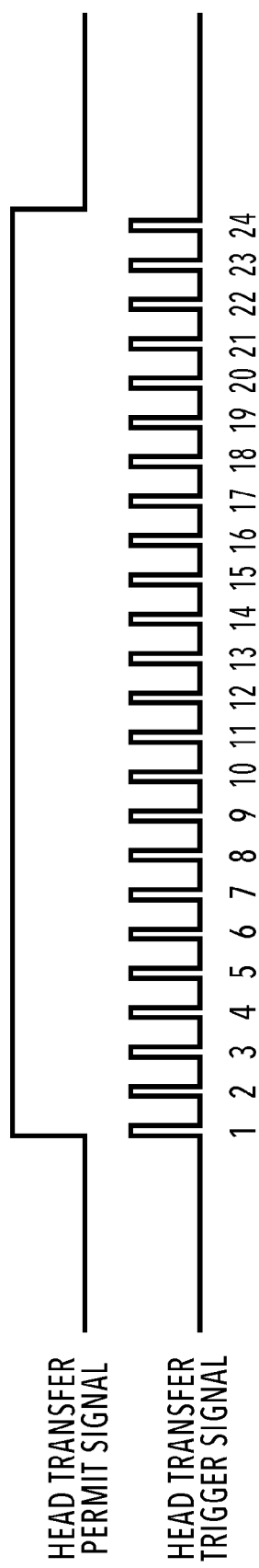
FIG. 5 is a diagram showing a head transfer permit signal and a head transfer trigger signal.

The head transfer timing signal generation unit 1001 outputs a head transfer permit signal and a head transfer trigger signal as shown in FIG. 5 to a head I/F 206 based on the input A-phase signal and B-phase signal and the position counter value.

In a case where the head transfer trigger signal becomes the High level in the state where the head transfer permit signal is at the High level, the head I/F 206 transfers print data corresponding to one line to the print head 8. In FIG. 5, the head transfer trigger signal has become the High level 24 times in the state where the head transfer permit signal is at the High level, and therefore, the head I/F 206 has read the print data corresponding to a total of 24 lines from the RAM 204 and transferred to the print head 8.

In the present embodiment, the position counter 1002 increments the position counter value for each rise edge of the A-phase signal, but the timing of increment may be for each fall edge of the A-phase signal. Further, the signal (target) that is monitored at the time of increment for each edge may be the B-phase signal. Here, a case is shown where the print engine unit 200 includes the one image processing controller (CPU) 205, the one ROM 203, and the one RAM 204. However, the numbers of image processing controllers (CPUs), ROMs, and RAMs included in the print engine unit 200 are not limited to one, respectively, and may be two or more.

A head carriage control unit 208 changes the orientation and position of the print head 8 in accordance with the operating state, such as the maintenance state and the printing state of the printing apparatus 1. An ink supply control unit 209 controls the ink supply unit 15 so that the pressure of the ink to be supplied to the print head 8 is adjusted within an appropriate range. A maintenance control unit 210 controls the operation of the cap unit 10 and the wiping unit 17 in the maintenance unit 16 at the time of performing the maintenance operation for the print head 8.

In the scanner engine unit 300, the main controller 101 controls hardware resources of a scanner controller 302 by using the RAM 106 as a work area in accordance with programs and various parameters stored in the ROM 107. Due to this, various mechanisms included in the scanner unit 3 are controlled. For example, by the main controller 101 controlling the hardware resources within the scanner controller 302 via a controller I/F 301, a document mounted on the ADF by a user is conveyed via a conveyance control unit 304 and read by a sensor 305. Then, the scanner controller 302 saves the read image data in a RAM 303. It is possible for the print controller 202 to cause the print head 8 to perform the printing operation based on the image data read by the scanner controller 302 by converting the image data acquired as described above into print data.

Figure 6:
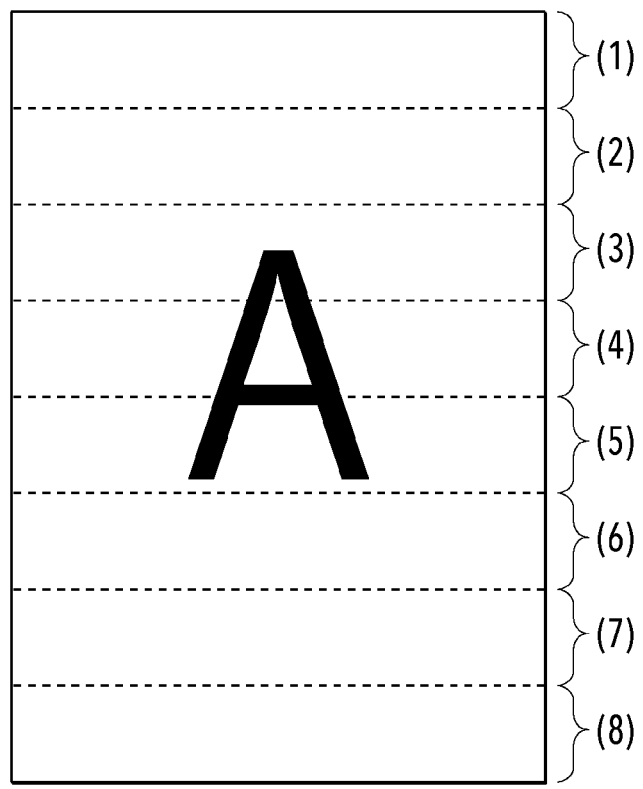
FIG. 6 is a diagram showing an image that is taken as a target of printing processing.

In the following, based on the configuration described above, by using FIG. 6 to FIG. 8, the configuration of the buffers (the first buffer that stores image data and the second buffer that stores print data) within the RAM 204 is explained, and further, by using FIG. 9 to FIG. 15, the specific processing in the printing apparatus 1 is explained. FIG. 6 is an image corresponding to one page that is the target of printing processing in the printing apparatus 1. In FIG. 6, printing of the image is planned and in accordance with the printing order of the image (that is, the conveyance direction of the printing sheet), the image is equally divided into eight areas, that is, an area (1) to an area (8) in the order from the upstream side in the conveyance direction.

Figure 7:
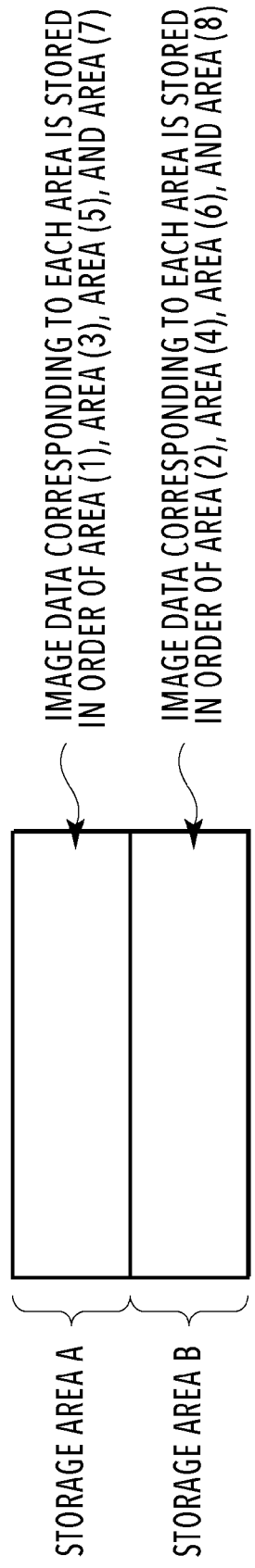
FIG. 7 is a diagram showing a configuration of a first buffer.

FIG. 7 is a diagram showing the configuration of the first buffer that stores image data received from the main controller 101 described above. The first buffer is configured within the RAM 204 as described above.

As shown in FIG. 7, the first buffer includes two storage areas each storing one of the eight areas obtained by equally dividing the image (that is, area corresponding to one eighth of the image). Hereinafter, one of the storage areas is referred to as a storage area A and the other storage area is referred to as a storage area B. Further, as shown in FIG. 7, in the printing apparatus 1, in the process of performing image processing, of the areas shown in FIG. 6, the areas (1), (3), (5), and (7) are temporarily stored in the storage area A and the areas (2), (4), (6), and (8) are temporarily stored in the storage area B. As a supplement, the control method of the first buffer will be described later by using FIG. 11 and FIG. 13.

Figure 8:
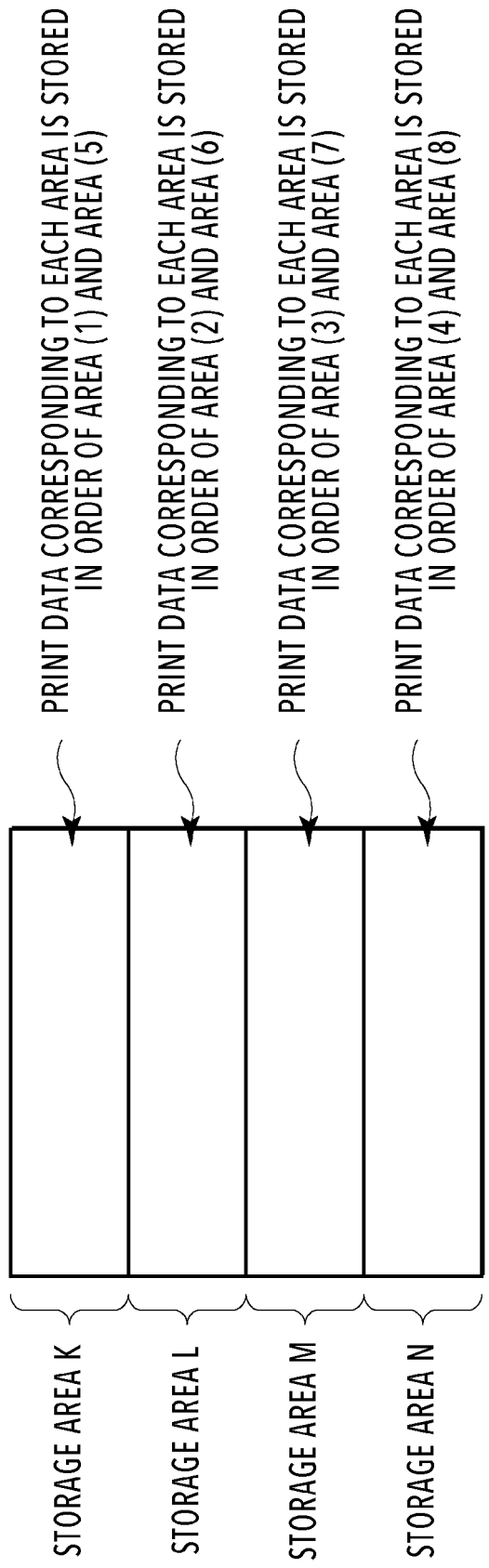
FIG. 8 is a diagram showing a configuration of a second buffer.

FIG. 8 is a diagram showing the configuration of the second buffer that stores the print data converted by the image processing controller 205 described above. The second buffer is configured within the RAM 204 as described above.

As shown in FIG. 8, the second buffer includes four storage areas each storing one of the eight areas obtained by equally dividing the image. Hereinafter, a first storage area of the four storage areas is referred to as a storage area K, a second storage area is referred to as a storage area L, a third storage area is referred to as a storage area M, and a fourth storage area is referred to as a storage area N. Further, in the printing apparatus 1, in the process of generating print data, of the areas shown in FIG. 6, the areas (1) and (5) are stored temporarily in the storage area K, the areas (2) and (6) are stored temporarily in the storage area L, the areas (3) and (7) are stored temporarily in the storage area M, and the areas (4) and (8) are stored temporarily in the storage area N. As a supplement, the control method of the second buffer will be described later by using FIG. 12 and FIG. 14.

Figure 9:
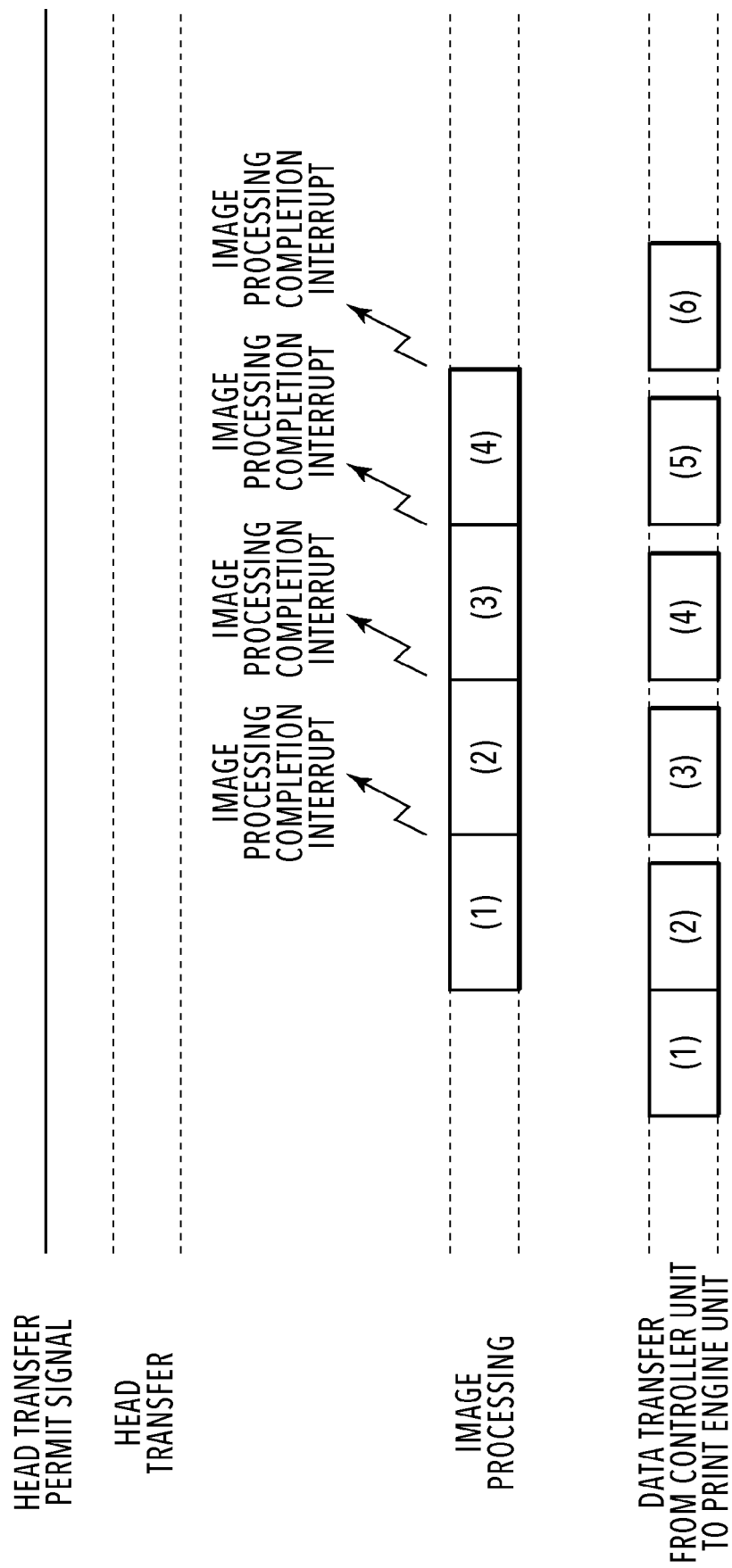
FIG. 9 is a timing chart showing a state of processing before a conveyance operation of a printing sheet.
Figure 10:
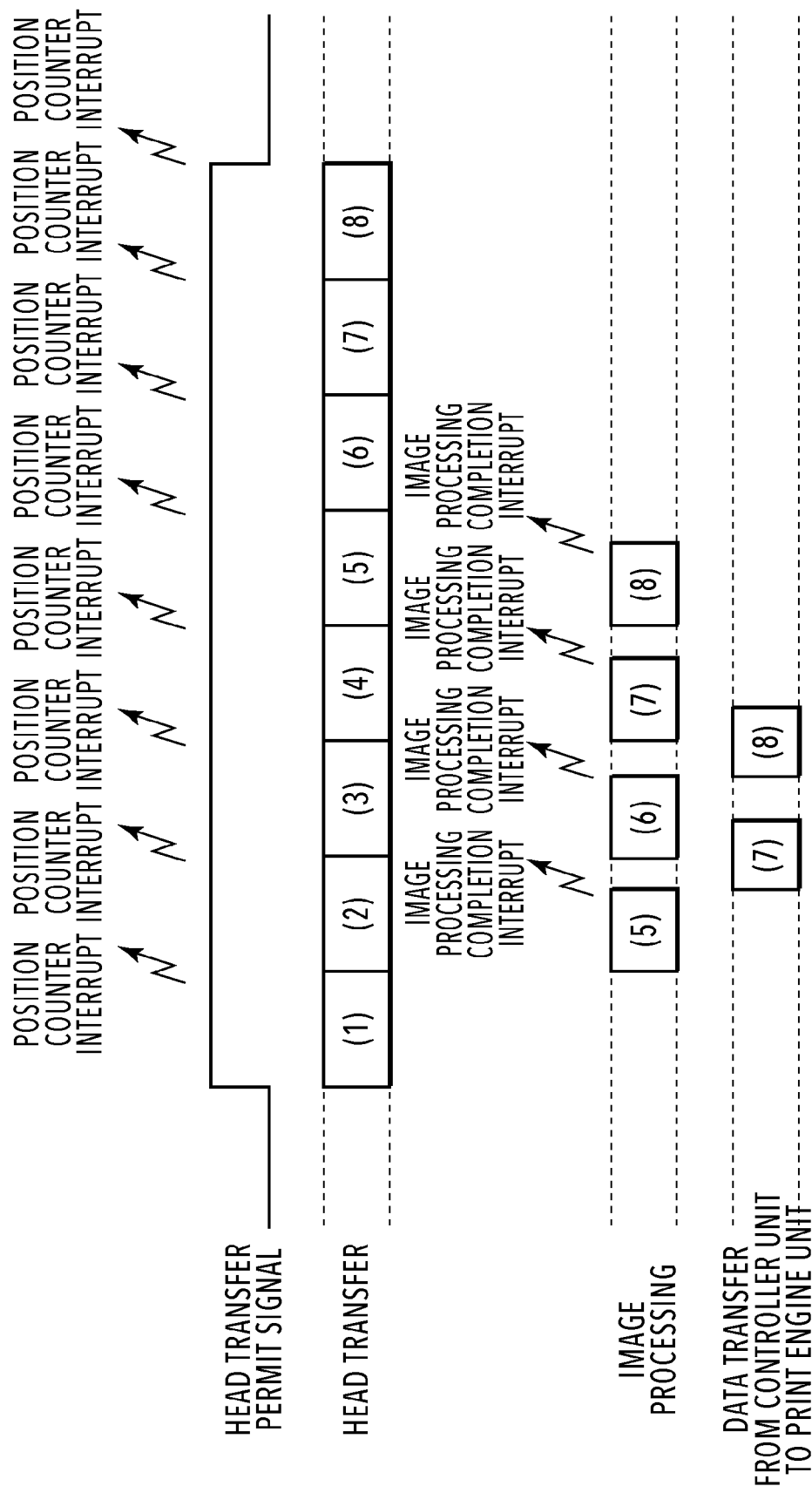
FIG. 10 is a timing chart showing a state of processing at the time of the conveyance operation of a printing sheet.
Figure 11:
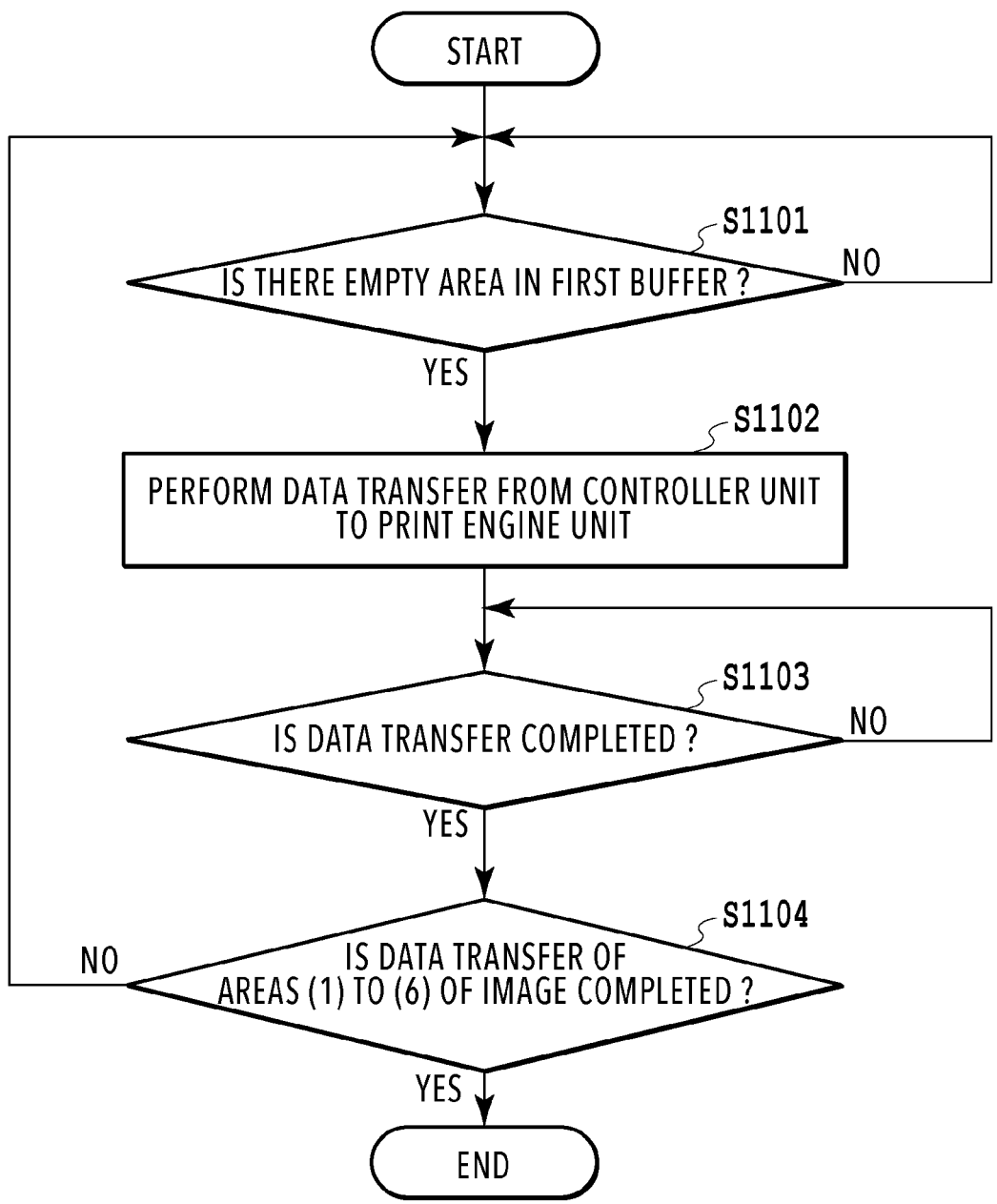
FIG. 11 is a flowchart showing a procedure of transfer processing of image data before the conveyance operation of a printing sheet.
Figure 12:
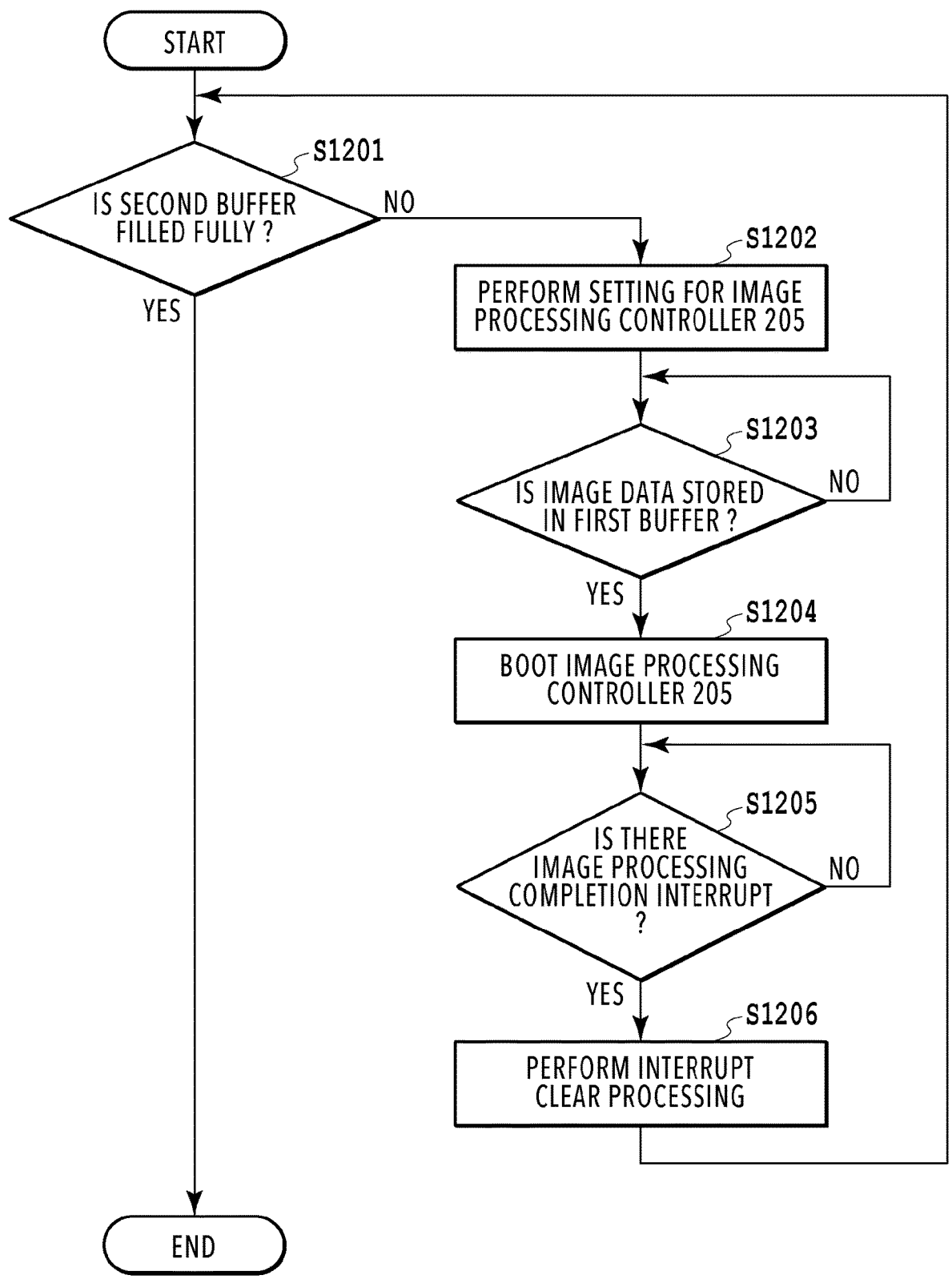
FIG. 12 is a flowchart showing a procedure of image processing before the conveyance operation of a printing medium.

Next, as the specific processing of the printing apparatus 1, by using FIG. 9, FIG. 11, and FIG. 12, transfer processing of image data and image processing before the conveyance operation of a printing sheet are explained. Further, by using FIG. 10, FIG. 13, FIG. 14, and FIG. 15, transfer processing of image data, image processing, and transfer processing of print data at the time of the conveyance operation of a printing sheet are explained.

FIG. 9 is a timing chart showing the head transfer permit signal, the state of head transfer, the image processing by the image processing controller 205, and the state of data transfer from the controller unit 100 to the print engine unit 200 before the conveyance operation of a printing sheet.

As describe above, FIG. 9 shows the state of processing before the conveyance operation of a printing sheet (that is, before execution of the printing processing) as a timing chart, and therefore, the head transfer permit signal is kept in the state of the Low level and head transfer of print data is not performed. On the other hand, data transfer (hereinafter, processing 1) from the controller unit 100 to the print engine unit 200 and image processing (hereinafter, processing 2) by the image processing controller 205 are performed until all the storage areas of the first buffer and the second buffer are filled fully. Specifically, in this case, the processing is performed until the image data of the area (5) is stored in the storage area A and the image data of the area (6) is stored in the storage area B of the first buffer, and the area (1) is stored in the area K, the area (2) is stored in the area L, the area (3) is stored in the area M, and the area (4) is stored in the area N of the second buffer.

In the following, in accordance with the timing chart in FIG. 9, processing 1 and processing 2 are explained. First, processing 1 is performed for the area (1) of the image. Then, after processing 1 for the area (1) is completed, that is, in a case where the image data of the area (1) is stored in the storage area A of the first buffer, processing 2 for the area (1) is performed.

Further, at the same time, the storage area B of the first buffer is empty, and therefore, processing 1 for the area (2) is performed and image data is stored in the storage area B.

Then, after processing 2 for the area (1) is completed, the image processing controller 205 outputs an image processing completion interrupt signal to the print controller 202. The print controller 202 having received the image processing completion interrupt signal further notifies the main controller 101 that processing 2 is completed.

The main controller 101 performs processing 1 for the area (3) because an empty area is produced in the storage area A of the first buffer in response to the completion of processing 2 for the preceding area (1) and stores image data in the storage area A. Further, the image processing controller 205 performs processing 2 for the area (2) because processing 1 for the area (2) is also already completed at the point in time at which processing 1 for the area (3) is started.

The series of processing is performed similarly also in the subsequent areas until all the storage areas of the first buffer and the second buffer are filled fully. That is, as described above, the series of processing is performed until that state is brought about where the areas (5) and (6) of the image are stored in the first buffer and the areas (1) to (4) of the image are stored in the second buffer.

FIG. 11 is a flowchart showing a procedure of the data transfer processing from the controller unit 100 to the print engine unit 200 before the conveyance operation of a printing sheet. Specifically, a flowchart showing a procedure of processing 1 for the areas (1) to (6) described above before the conveyance operation of a printing sheet.

At step S1101, the main controller 101 determines whether or not there is an empty area in the first buffer within the RAM 204. In a case of determining that there is not an empty area in the first buffer (No at S1101), the main controller 101 stands by until an empty area is produced in the first buffer. On the other hand, in a case of determining that there is an empty area in the buffer (Yes at S1101), the main controller 101 advances the processing to step S1102.

At step S1102, the main controller 101 transfers the image data corresponding to one of the eight areas obtained by equally dividing the image from the controller unit 100 to the print engine unit 200. That is, the main controller 101 performs processing 1. At step S1102, each time the processing at steps S1101 to S1104 is performed, the area is shifted to the downstream side in the conveyance direction (that is, the area is changed from the area (1) to the area (2), from the area (2) to the area (3)) and processing 1 is performed in order from the area (1).

At step S1103, the main controller 101 determines whether or not the transfer of the image data transferred from the controller unit 100 at step S1120 to the print engine unit 200 is completed. That is, the main controller 101 determines whether or not processing 1 is completed. In a case of determining that processing 1 is not completed (No at S1103), the main controller 101 stands by until processing 1 is completed. On the other hand, in a case of determining that processing 1 is completed (Yes at S1103), the main controller 101 advances the processing to step S1104.

At step S1104, the main controller 101 determines whether or not processing 1 is completed for the areas (1) to (6) of the image. Then, in a case of determining that processing 1 for all the areas (1) to (6) of the image is not completed yet (No ate S1104), the main controller returns the processing to step S1101 after shifting the area to the downstream side in the conveyance direction as described above. On the other hand, in a case of determining that processing 1 for all the areas (1) to (6) of the image is completed (Yes at S1104), the main controller 101 terminates the processing shown in FIG. 11.

FIG. 12 is a flowchart showing a procedure for causing the image processing controller 205 to perform image processing before the conveyance operation of a printing sheet. Specifically, a flowchart showing a procedure of processing 2 for (1) to (4) described above before the conveyance operation of a printing sheet.

At step S1201, the print controller 202 determines whether or not the state is a state where all the storage areas of the second buffer are filled fully. In a case of determining that the state is not a state where all the storage areas of the second buffer are filled fully (No at S1201), the print controller 202 advances the processing to step S1202.

At step S1202, the print controller 202 performs various kinds of setting of, for example, such as an image processing parameter and a DMA address, for the image processing controller 205. Regarding step S1202, in a case where the processing is performed for the area (1), after this, it is not necessarily required to perform the processing, and it is sufficient to perform the processing appropriately in accordance with a change in environment or the like.

At step S1203, the print controller 202 determines whether or not image data is stored in the first buffer within the RAM 204. In a case of determining that image data is not stored in the first buffer (No at S1203), the print controller 202 stands by until image data is stored in the first buffer. On the other hand, in a case of determining that image data is stored in the first buffer (Yes at S1203), the print controller 202 advances the processing to step S1204.

At step S1204, the print controller 202 boots the image processing controller 205 and causes the image processing controller 205 to start image processing. That is, the print controller 202 causes the image processing controller 205 to start processing 2.

After causing the image processing controller 205 to start processing 2, at step S1205, the print controller 202 determines whether or not an interrupt signal relating to image processing completion accompanying the completion of processing 2 is received. In a case of determining that the interrupt signal relating to image processing completion is not received at step S1205 (No at S1205), the print controller 202 stands by until the interrupt signal is received. On the other hand, in a case of determining that the interrupt signal relating to image processing completion is received (Yes at S1205), the print controller 202 advances the processing to step S1206.

At step S1206, the print controller 202 performs clear processing of the received interrupt signal. After performing the processing at step S1206, the print controller 202 shifts the area to the downstream side in the conveyance direction (that is, for example, the area is changed from the area (1) to the area (2), from the area (2) to the area (3), and so on) and returns the processing to step S1201. After this, at step S1201, in a case where all the storage areas of the second buffer are filled fully (Yes at S1201), it is determined that the image processing in the areas (1) to (4) of the image (that is, generation of print data) is completed and the processing shown in FIG. 12 is terminated.

Next, transfer processing of image data, image processing, and transfer processing of print data (head transfer processing) at the time of the conveyance operation of a printing sheet are explained. FIG. 10 is a timing chart showing the head transfer permit signal, the state of head transfer, the image processing by the image processing controller 205, and the state of data transfer from the controller unit 100 to the print engine unit 200 at the time of the conveyance operation of a printing sheet.

As described above, FIG. 10 shows the state of the processing at the time of the conveyance operation of a printing sheet (that is, the state where printing processing is performed while conveying a printing sheet) as a timing chart and further, the processing is shown as processing that follows the processing shown in FIG. 9.

As shown in FIG. 10, the head transfer permit signal becomes the High level at the position at which the printing operation is started. In a case where the head transfer trigger signal becomes the High level in the state where the head transfer permit signal is kept at the High level, the head I/F 206 reads the print data from the storage area in which the area (1) of the image is stored of the second buffer and transfers the print data to the print head 8. That is, in accordance with the level of a predetermined transfer signal, the head I/F 206 reads the print data from the storage area K and transfers the print data to the print head 8.

The head transfer trigger signal is the signal shown in FIG. 5 described above (that is, the signal output from the head transfer timing signal generation unit 1001 based on the position counter value input from the position counter 1002) and is not shown schematically in FIG. 10. Further, in the position counter 1002, a value corresponding to the position corresponding to one eighth in the conveyance direction from the front end of the image is set in advance as the position counter interrupt value. Consequently, in a case where the printing sheet is conveyed up to the position (that is, in a case where the position counter value corresponding to the conveyance amount corresponding to one eighth of the image is reached), a position counter interrupt signal is output to the print controller 202.

In addition, in the present embodiment, the way the print data read from the second buffer is transferred to the print head 8 is explained, but in more detail, the control data including the print data (that is, control data for controlling the print head 8) is transferred to the print head 8. In the control data, in addition to the print data, various kinds of setting information relating to the printing processing, such as information for controlling the ink ejection amount, are included.

Upon receipt of the position counter interrupt signal, the print controller 202 performs the clear processing of the interrupt signal for the position counter 1002. After performing the clear processing of the interrupt, next, the print controller 202 sets a value corresponding to the position corresponding to two eighths in the conveyance direction from the front end of the image that is printed on a printing sheet to the register of the position counter 1002 as the position counter interrupt value. Consequently, in a case where the printing sheet is conveyed up to the position (that is, in a case where the position counter value corresponding to the conveyance amount corresponding to two eighths of the image is reached), a position counter interrupt signal is output to the print controller 202.

Further, the print controller 202 determines that the printing processing for the area (1) of the image is completed (that is, the print data is already transferred to the print head 8) because of the reception of the position counter interrupt signal. That is, by receiving the position counter interrupt signal, the print controller 202 determines (regards) that an empty capacity is produced in the second buffer because the area (1) of the print data is transferred to the print head 8. By receiving the position counter interrupt signal (that is, by determining that an empty capacity is produced in the second buffer), the print controller 202 starts processing 2 for the area (5) stored in the storage area A of the first buffer. Then, in a case where processing 2 is completed, the print controller 202 stores the generated print data of the area (5) in the second buffer. As described above, in the present embodiment, processing 2 is started in accordance with the position counter interrupt signal generated based on the signal output from the encoder, and therefore, it is not necessary for the print controller 202 to check an empty capacity of the second buffer.

After this also, the print controller 202 similarly determines that the print data of the area corresponding to one eighth of the image is transferred to the print head 8 each time of receiving the position counter interrupt signal from the position counter 1002 and performs the interrupt clear processing and processing 2.

Further, in a case of receiving a completion notification (that is, image processing completion interrupt signal) relating to processing 2 from the print controller 202, the main controller 101 transfers the areas (7) and (8) of the image whose transfer to the print engine unit 200 is not completed yet.

As described above, the transfer processing of image data (that is, processing 1), the image processing (that is, processing 2), and the transfer processing of print data at the time of the conveyance operation of a printing sheet are performed.

Figure 15:
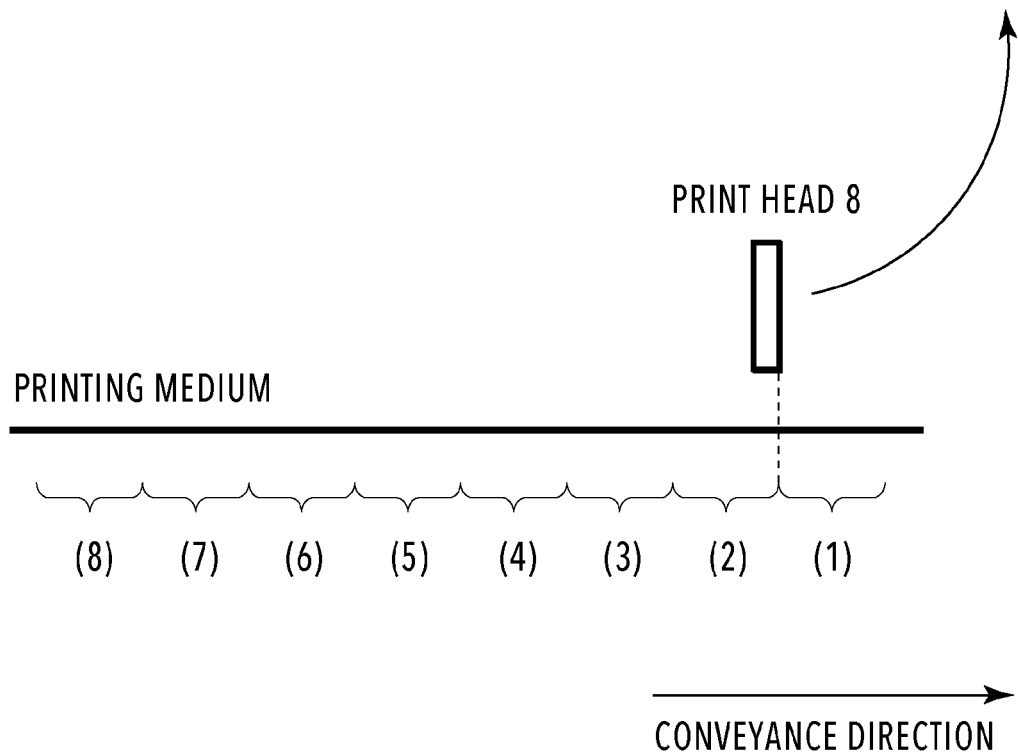
FIG. 15 is a diagram showing a position relationship between a print head and image data that is printed on a printing medium.

As a supplement, by using FIG. 15, the timing at which the position counter interrupt signal is output is explained. FIG. 15 is a diagram showing a position relationship between the print head and image data that is printed on a printing medium. In FIG. 15, the timing at which the first position counter interrupt signal is output in FIG. 10 described above is shown.

As shown in FIG. 15, in a case where the printing processing relating to all the colors is completed (that is, at timing at which the printing sheet is conveyed up to the position at which the printing processing is completed) in the area corresponding to the area (1) of the image data, the position counter 1002 outputs the position counter interrupt signal.

Figure 13:
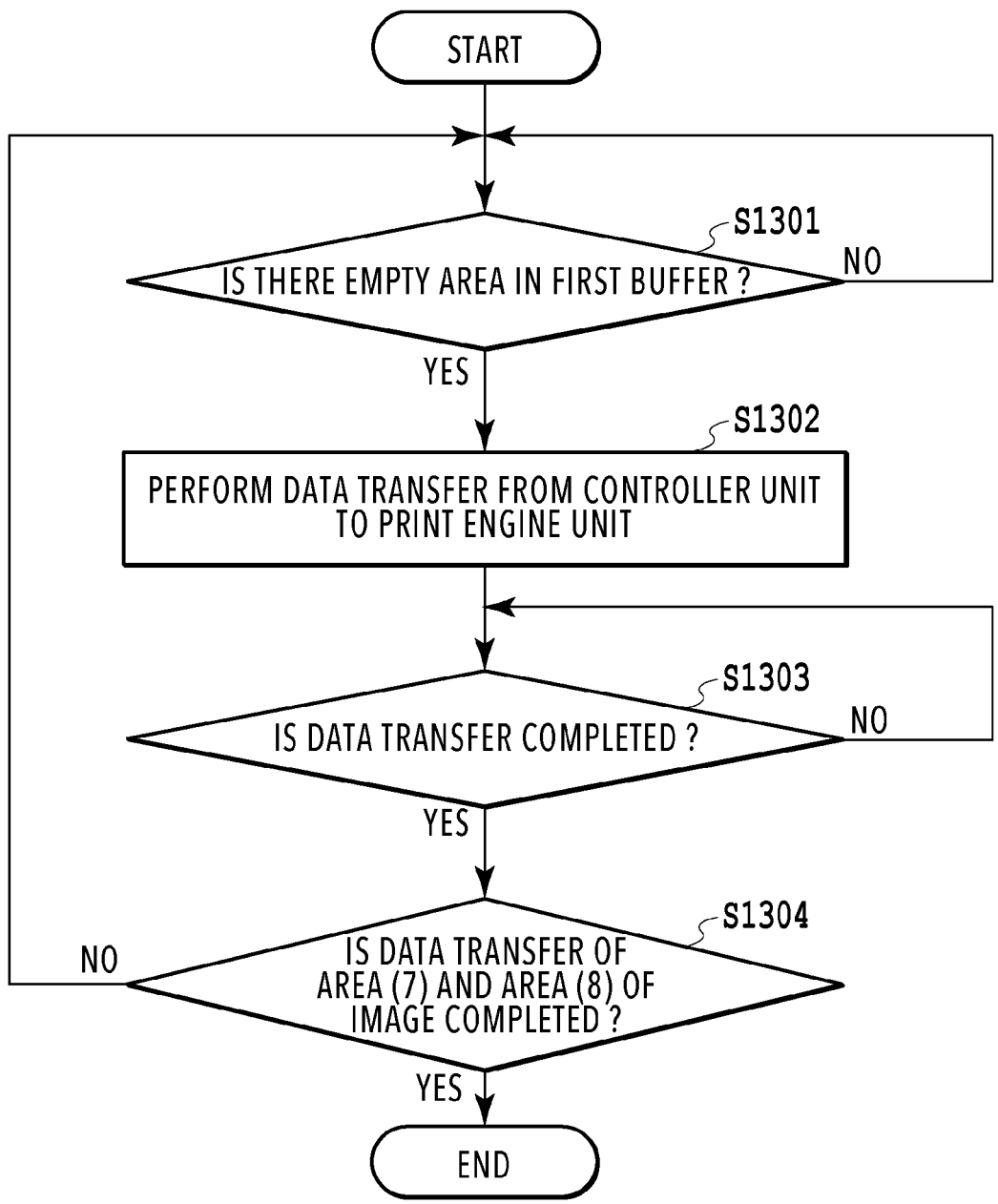
FIG. 13 is a flowchart showing a procedure of transfer processing of image data at the time of the conveyance operation of a printing sheet.

FIG. 13 is a flowchart showing a procedure of transfer processing of data from the controller unit 100 to the print engine unit 200 at the time of the conveyance operation of a printing sheet. Specifically, FIG. 13 is a flowchart showing a procedure of processing 1 for the areas (7) and (8) described above at the time of the conveyance operation of a printing sheet and the procedure is the same as the procedure of processing 1 for the areas (1) to (6) described above before the conveyance operation of a printing sheet.

At step S1301, the main controller 101 determines whether or not there is an empty area in the first buffer within the RAM 204. In a case of determining that there is no empty area in the first buffer (No at S1301) the main controller 101 stands by until an empty area is produced in the first buffer. On the other hand, in a case of determining that there is an empty area in the first buffer (Yes at S1301), the main controller 101 advances the processing to S1302.

At step S1302, the main controller 101 transfers the image data corresponding to one of the eight areas obtained by equally dividing the image from the controller unit 100 to the print engine unit 200. That is, main controller 101 performs processing 1. At step S1302, each time the processing at steps S1301 to S1304 in FIG. 13 is performed, the area is shifted from the area (7) to the area (8) to the downstream side in the conveyance direction and processing 1 is performed.

At step S1303, the main controller 101 determines whether or not the transfer of the image data transferred from the controller unit 100 at step S1302 to the print engine unit 200 is completed. That is, the main controller 101 determines whether or not processing 1 is completed. In a case of determining that processing 1 is not completed yet (No at S1303), the main controller 101 stands by until processing 1 is completed. On the other hand, in a case of determining that processing 1 is completed (Yes at S1303), the main controller 101 advances the processing to S1304.

At step S1304, the main controller 101 determines whether or not processing 1 is completed for the area (7) and the area (8) of the image. Then, in a case of determining that processing 1 is not completed for the area (7) and the area (8) of the image (No at S1304), after shifting the area from the area (7) to the area (8) to the downstream side in the conveyance direction as described above, the main controller 101 returns the processing to step S1301. On the other hand, in a case of determining that processing 1 is completed for the area (7) and the area (8) of the image (Yes at S1304), the main controller 101 terminates the processing shown in FIG. 13.

Figure 14:
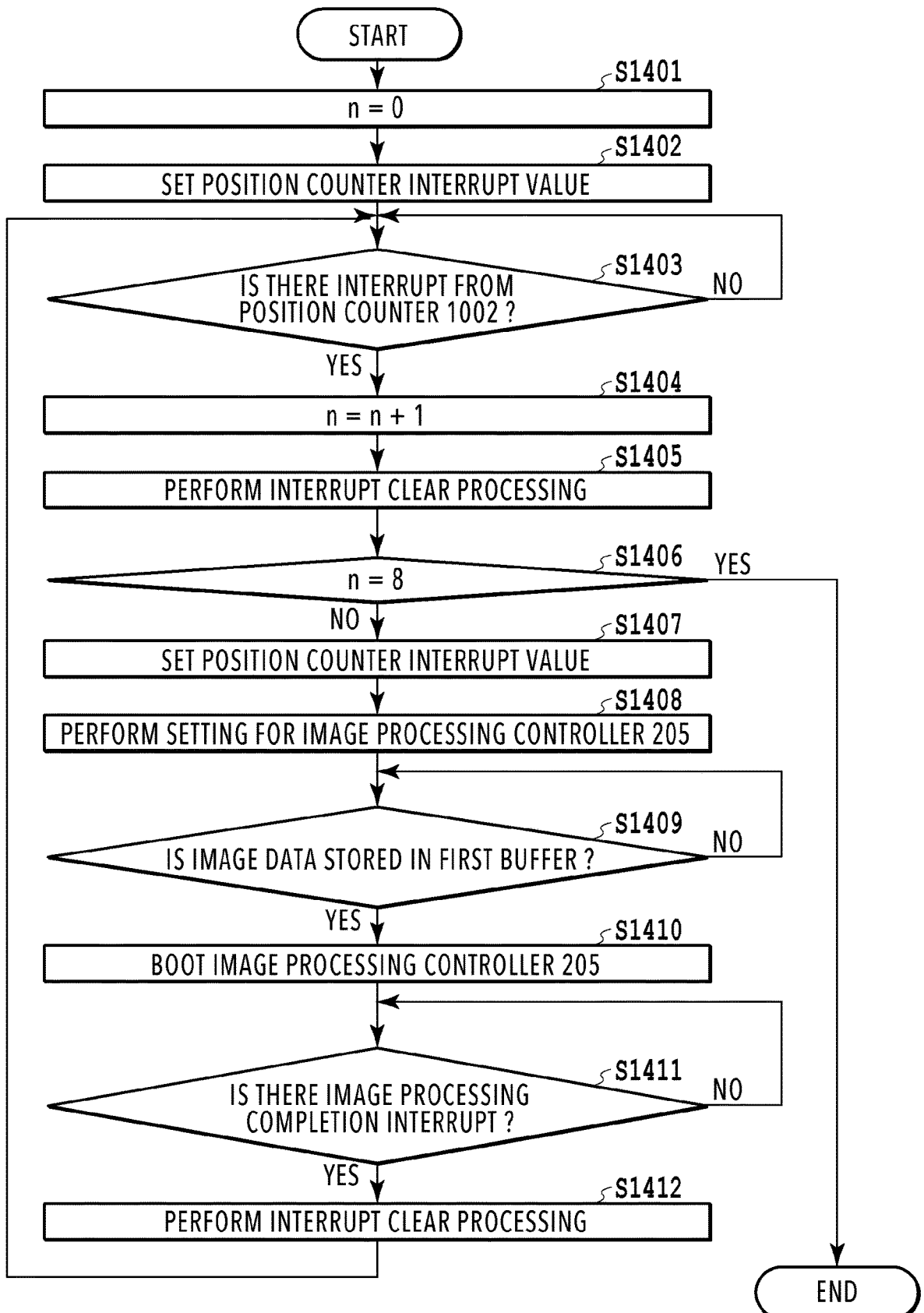
FIG. 14 is a flowchart showing a procedure of processing at the time of the conveyance operation of a printing sheet.

FIG. 14 is a flowchart showing a procedure of processing by the print engine unit 200 at the time of the conveyance operation of a printing sheet. Specifically, FIG. 14 is a flowchart showing the conveyance operation (printing processing) of a printing sheet for the areas (1) to (8) described above and a procedure of processing 2 for the areas (5) to (8) described above at the time of the conveyance operation of a printing sheet.

At step S1401, the print controller 202 initializes a variable n for counting the number of times of position counter interrupt that is output from the position counter 1002. That is, the print controller 202 sets 0 to the variable n.

At step S1402, a position counter interrupt value is set to the register within the position counter 1002 so that a position counter interrupt signal is output in a case where the printing sheet is conveyed from the front end of the image up to the position corresponding to one eighth in the conveyance direction. That is, the position counter interrupt value is set to the register within the position counter 1002 so that the position counter interrupt signal is output in a case where the position counter value corresponding to the conveyance amount corresponding to one eighth of the image is reached.

At step S1403, the print controller 202 determines whether or not the position counter interrupt signal is output from the position counter 1002. In a case where the position counter interrupt signal is not output (No at S1403), the print controller 202 stands by until the position counter interrupt signal is output and in a case where the position counter interrupt signal is output (Yes at S1403), the print controller 202 advances the processing to step S1404.

At step S1404, the print controller 202 adds 1 to the variable n described above (increments the variable n) because the position counter interrupt signal is output. At step S1405, the print controller 202 performs the clear processing of the interrupt signal for the position counter 1002.

At step S1406, the print controller 202 determines whether or not the variable n is 8, that is, whether or not the position counter interrupt signal is output eight times. In a case of determining that the variable n is not 8 (to be more exact, in a case of determining that the variable n is less than 8) (No at S1406), the print controller 202 advances the processing to step S1407.

Next, at step S1407, a position counter interrupt value is set to the register within the position counter 1002 so that a position counter interrupt signal is output in a case where the printing sheet is conveyed from the front end of the image up to the position corresponding to two eighths in the conveyance direction. That is, the position counter interrupt value is set to the register within the position counter 1002 so that the position counter interrupt signal is output in a case where the position counter value corresponding to the conveyance amount corresponding to two eighths of the image is reached.

At step S1408, the print controller 202 performs various kinds of setting of, for example, such as an image processing parameter and a DMA address, for the image processing controller 205. Regarding step S1408, in a case where the processing is performed for the area (5), after this, it is not necessarily required to perform the processing and it is sufficient to perform the processing appropriately in accordance with a change in environment or the like.

At step S1409, the print controller 202 determines whether or not the image data for which the transfer from the controller unit 100 to the print engine unit 200 is completed (that is, image data for which processing 1 is completed) is stored in the first buffer. In a case of determining that the image data is not stored in the first buffer (No at S1409), the print controller 202 stands by until the image data is stored in the first buffer. On the other hand, in a case of determining that the image data is stored in the first buffer (Yes at S1409), the print controller 202 advances the processing to step S1410.

At step S1410, the print controller 202 boots the image processing controller 205 and causes the image processing controller 205 to start image processing. That is, the print controller 202 causes the image processing controller 205 to start processing 2.

After causing the image processing controller 205 to start processing 2, the print controller 202 determines whether or not the interrupt signal relating to the image processing completion accompanying the completion of processing 2 is received at step S1411. In a case of determining that the interrupt signal relating to the image processing completion is not received at step S1411 (No at S1411), the print controller 202 stands by until the interrupt signal is received. On the other hand, in a case of determining that the interrupt signal relating to the image processing completion is received (Yes at S1411), the print controller 202 advances the processing to step S1412.

At step S1412, the print controller 202 performs the clear processing of the received interrupt signal. Then, after performing the clear processing of the interrupt signal, the print controller 202 returns the processing to step S1403. After this, the processing is performed until it is determined that the variable n is 8 at step S1406 and in a case where it is determined that the variable n is 8 at step 1406 (that is, in a case where it is determined that the printing operation is completed), the processing shown in FIG. 14 is terminated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In addition, in the embodiments described above, explanation is given by supposing specifications in which the image that is the target of printing processing is divided into eight images and each time the printing sheet is conveyed by an amount corresponding to one of the eight divided areas (that is, area corresponding to one eighth of the image), the position counter interrupt signal is output. However, the specifications in which the position counter interrupt signal is output are not necessarily limited to those. Consequently, it may also be possible to output the position counter interrupt signal each time the printing sheet is conveyed by an amount corresponding to an area other than the area corresponding to one eighth of the image (for example, area corresponding to one sixteenth of the image).

Further, explanation is given by supposing that the first buffer has the structure in which two areas, each corresponding to one eighth of the image, are included, but as long as the storage capacity of the RAM 204 accepts, the number of areas may be more than two. Similarly, explanation is given by supposing that the second buffer also has the structure in which four areas, each corresponding to one eighth of the image, are included, but as long as the storage capacity of the RAM 204 accepts, the number of areas may be more than four.

Further, as a complement, the capacity of the first buffer is set so as to be smaller than the data size of the image data and the capacity of the second buffer is set so as to be smaller than the data size of the print data converted from the image data.

In addition, the capacity of the first buffer and that of the second buffer are set based on the transfer speed (communication speed) of the data transfer to the print engine unit 200, the conversion speed of the conversion processing from image data into print data, and the transfer speed of the data transfer to the print head 8. Further, the capacity ratio between the first buffer and the second buffer is also set similarly.

According to the present invention, it is possible to provide an image forming apparatus capable of simple buffer control in a printing apparatus including a plurality of nozzle rows.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-067506, filed Mar. 30, 2018, which is hereby incorporated by reference wherein in its entirety.

What is claimed is:

1. A printing apparatus comprising:
    a conveyance unit configured to convey a printing medium in a first direction;
    an encoder that outputs a predetermined signal in accordance with a drive amount of the conveyance unit, the drive amount corresponding to a conveyance amount of the printing medium in the first direction;
    a print head having a plurality of nozzles for ejecting ink, with the nozzles arrayed in a second direction intersecting with the first direction; and
    a print engine connected with the print head and performing conversion processing from image data into print data, wherein
    the print engine:
        has a first buffer storing the image data;
        has a second buffer storing the print data; and
        converts image data stored in the first buffer into print data in response to a first interrupt signal based on the predetermined signal output from the encoder, and stores the print data in the second buffer, and
    wherein the print engine further stores another piece of image data not stored in the first buffer in the first buffer in response to a second interrupt signal based on completion of the conversion processing of preceding image data.

2. The printing apparatus according to claim 1, further comprising:
    a controller connected with the print engine by a predetermined interface and controlling the print engine, wherein
    the image data is transferred from the controller to the print engine in response to the second interrupt signal, and the image data is stored in the first buffer.

3. The printing apparatus according to claim 2, wherein
    to the first buffer, each piece of image data obtained by dividing image data corresponding to one page into a predetermined number of pieces of image data is transferred from the controller and
    the print engine performs the conversion processing for each piece of the divided image data and generates divided print data.

4. The printing apparatus according to claim 3, wherein the controller divides the image data into a predetermined number of pieces of image data in accordance with order of printing an image on the printing medium.

5. The printing apparatus according to claim 3, wherein a capacity of the first buffer is set so as to be smaller than a data size of image data corresponding to one page and a capacity of the second buffer is set so as to be smaller than a data size of print data corresponding to one page.

6. The printing apparatus according to claim 3, wherein the print engine outputs the second interrupt signal and starts the conversion processing of next divided image data without checking an empty capacity of the second buffer in a case where the predetermined signal output from the encoder becomes a predetermined counter value.

7. The printing apparatus according to claim 1, wherein the print engine further performs transfer processing to transfer control data including print data stored in the second buffer to the print head in response to a transfer signal based on the predetermined signal output from the encoder.

8. The printing apparatus according to claim 7, wherein capacities of the first buffer and the second buffer are set in accordance with a communication speed of the predetermined interface, a conversion speed of converting the image data into the print data, and a transfer speed of transferring the control data to the print head.

9. A control method of a printing apparatus comprising:
    a conveyance unit configured to convey a printing medium in a first direction;
    an encoder that outputs a predetermined signal in accordance with a drive amount of the conveyance unit, the drive amount corresponding to a conveyance amount of the printing medium in the first direction; and
    a print head having a plurality of nozzles for ejecting ink, with the nozzles arrayed in a second direction intersecting with the first direction, the control method comprising:
        a step of storing image data in a first buffer;
        a conversion processing step of converting the image data into print data; and
        a step of storing the print data in a second buffer, wherein
    image data stored in the first buffer is converted into print data in response to a first interrupt signal based on the predetermined signal output from the encoder, and the print data is stored in the second buffer, and
    wherein at the step of storing image data in the first buffer, another piece of image data not stored in the first buffer is stored in the first buffer in response to a second interrupt signal based on completion of the conversion processing of preceding image data.

10. The control method of a printing apparatus according to claim 9, wherein
    the image data is transferred from a controller connected by a predetermined interface and stored in the first buffer in response to the second interrupt signal.

11. The control method of a printing apparatus according to claim 10, wherein
    to the first buffer, each piece of image data obtained by dividing image data corresponding to one page into a predetermined number of pieces of image data is transferred from the controller and
    at the conversion processing step, the image data is converted into print data divided for each piece of the divided image data.

12. The control method of a printing apparatus according to claim 11, wherein
    the image data corresponding to one page is divided into a predetermined number of pieces of image data in accordance with order of printing an image on the printing medium.

13. The control method of a printing apparatus according to claim 11, wherein
    a capacity of the first buffer is set so as to be smaller than a data size of image data corresponding to one page and a capacity of the second buffer is set so as to be smaller than a data size of print data corresponding to one page.

14. The control method of a printing apparatus according to claim 11, wherein
    the conversion processing step is a step of outputting the second interrupt signal and converting next divided image data into print data without checking an empty capacity of the second buffer in a case where the predetermined signal output from the encoder becomes a predetermined counter value.

15. The control method of a printing apparatus according to claim 9, further comprising:

a transfer step of transferring control data including print data stored in the second buffer to the print head in response to a transfer signal based on the predetermined signal output from the encoder.

16. The control method of a printing apparatus according to claim 15, wherein capacities of the first buffer and the second buffer are set in accordance with a communication speed of the predetermined interface, a conversion speed of converting the image data into the print data, and a transfer speed of transferring the control data to the print head.

17. A printing apparatus comprising:

a conveyance unit configured to convey a printing medium in a first direction;

an encoder that outputs a predetermined signal in accordance with a drive amount of the conveyance unit, the drive amount corresponding to a conveyance amount of the printing medium in the first direction;

a print head having a plurality of nozzles for ejecting ink, which are arrayed in a second direction intersecting with the first direction; and a print engine connected with the print head and performing conversion processing from image data into print data, wherein the print engine:
has a first buffer storing the image data;
has a second buffer storing the print data; and
converts image data stored in the first buffer into print data in response to a first interrupt signal based on the predetermined signal output from the encoder, and stores the print data in the second buffer, the print engine further performs transfer processing to transfer control data including print data stored in the second buffer to the print head in response to a transfer signal based on the predetermined signal output from the encoder.

\* \* \* \* \*